No. 707,247. Patented Aug. 19, 1902.
L. J. MERRIMAN.
PLANT PROTECTOR.
(Application filed Aug. 19, 1901.)
(No Model.)
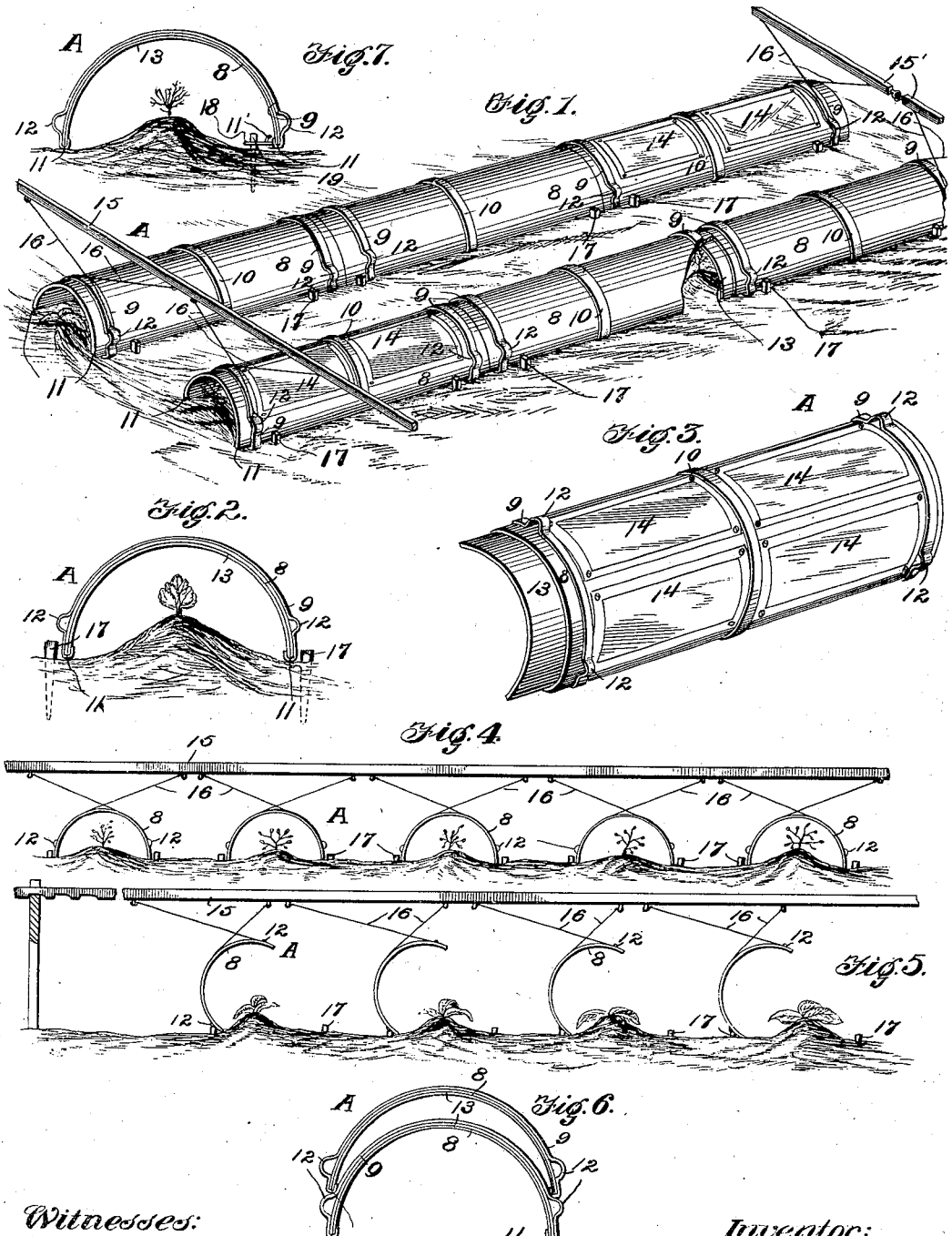
Witnesses:
F. G. Campbell.
R. W. Pittman
Inventor:
Leonard J. Merriman.
By his Attorney,
F. H. Richards.

UNITED STATES PATENT OFFICE.

LEONARD J. MERRIMAN, OF IVANHOE, NORTH CAROLINA.

PLANT-PROTECTOR.

SPECIFICATION forming part of Letters Patent No. 707,247, dated August 19, 1902.

Application filed August 19, 1901. Serial No. 72,465. (No model.)

*To all whom it may concern:*

Be it known that I, LEONARD J. MERRIMAN, a citizen of the United States, residing in Ivanhoe, in the county of Sampson and State of North Carolina, have invented certain new and useful Improvements in Plant-Protectors, of which the following is a specification.

This invention relates to plant-protectors, and has for its object to provide an efficient and economical device for protecting plants from the rays of the sun and from violence of the elements.

A further object of the invention is to provide a protector which may be operated to cover and uncover the plants in a series or a plurality of series at the same time.

A further object of the invention is to provide protectors which may be compactly but loosely nested for shipping or when not in use.

In the raising of certain vegetables and small fruits it is desirable to protect the plants after having been transplanted from the rays of the sun, and when it is desired to raise plants for an early market it is desirable to protect them from frost, freezes, and uncongenial winds, and when the crop is nearing maturity or about to be gathered for market to protect them from rains and unseasonable frosts and winds.

In carrying out my invention I provide a protector which, if desired, may be made of wood, preferably having in cross-section a form substantially of a segment of a circle, which may be readily placed over the plants and removed therefrom. If it is desired to employ a series of these protectors to cover a row of plants, the ends of one section may overlap the ends of an adjoining section. For the purpose of procuring neater and more efficient joints in the series the ends of the sections are rabbeted, so that a line of sections will lie together, forming practically one long section. If the sections are made of thin wood or veneer, it may be found desirable to reinforce the sections at the ends or other portions with suitable band or hoop sections. The hoop-sections, if desired, may be provided with upset portions, forming projecting eyes near the edges of the sections. When the protector-sections are not in use, they may be nested one upon the other, the projections on a lower section affording support for the section above. Such nesting will get them out of the way and also protect them from the weather if piled up out in the field where they have been used. If a large number of the sections are used, it is frequently desirable to employ some means whereby several of them may be raised from the plants at one time, and thereby held in their raised positions, the object of course being to save labor, to which end a series of connections may be employed. One form of applying this means is to have a bar or a series of connected sticks running in a direction transverse to the series of protectors and having some flexible connections secured to the eyes of the hoop-sections, if hoop-sections are used, the connection, which is fastened to one side of the protector, passing over the vertex thereof and secured to the shifting means. By such a connection the transverse movement of the parts will produce a rolling motion of the sections.

In the accompanying drawings, forming part of this specification, Figure 1 is a perspective view representing two rows of plant-protectors embodying my present improvements, and Fig. 2 is a transverse sectional view of a single protector. Fig. 3 is an outer perspective view of a single protector turned upwardly on one of its edges to better indicate the peculiar construction thereof. Fig. 4 is an end view indicating five of my improved protectors disposed over a similar number of plants or rows of plants, said view showing suitable means for raising the protectors to expose the plants when desired. Fig. 5 is a similar view of four protectors as raised or elevated and secured in such position. Fig. 6 is an end view of two sections of the protector nested, and Fig. 7 is a view showing a modification.

Similar characters of reference refer to corresponding parts in the various figures.

The protector-sections (designated in a general way by A) each comprise a body portion 8, made of some suitable material, which may be wood in the form of veneer, if desired, and which has the form of the segment of a circle and is provided with suitable hoop-sections 9 at near the ends and for greater stability with intermediate hoop-sections 10, some or all of which hoop-sections are preferably bent at 11 around under the edges of the body portions of the protector-sections, and the end hoop-sections are each provided with upset or outwardly-projecting lugs 12, forming eyes. The ends of the protector-sections are preferably rabbeted at 13, and they also may be provided with suitable windows 14, made of paper or fabric or some other suitable material, which may or may not be constructed to admit a small amount or percentage of air.

For the purpose of raising the sections some suitable means may be employed, such as a bar 15 or a series of connected sticks 15', connected to the eyes at the end of one protector-section or a series of sections by some flexible connection, such as wires 16. The wires may be secured to one of the sections by eyes there provided and each wire laid across the side to which it is attached, the two wires crossing each other at about the vertical median line of the protector-section, with the ends thereof secured to the lifting or operating bar. In this way the wires are permitted to have a working movement past each other in the movements imparted to said operating-bar to raise or lower the sections.

In applying the protector-sections to rows of plants the rabbeted ends thereof permit the sections to be freely lapped the one over the other successively throughout the full number which may be employed in each row or series of sections, and the raising and lowering devices are preferably arranged so that all or a part only of said protector-sections may be raised and lowered together when desired. Thus in Fig. 1 the operating device 15' may be operated to raise and lower the whole of each series with which it is in connection in virtue of the described manner of fitting together the ends of the sections. On operating the left-hand bar 15, Fig. 1, however, the two left-hand sections alone will be raised or lowered, due to the fact that they each overlap rather than underlap the next adjacent section thereto. Either or both of the operating bars or devices herein shown may obviously be extended and similarly connected with the transverse sections of as many more series of sections as it may be desired to employ. To prevent the sections from slipping on the ground while being raised or lowered or after having been secured in the raised position, pins or sticks driven into the ground, as indicated at 17, may be employed. Thus it will be seen that the sections may be tipped in either direction and secured in such tilted position and may be readily returned to their normal position. In Fig. 7 I have shown a modified form of joint for hinging the sections to the ground, which consists in having the portion of the hoop 10 which passes under the edge of the section continued at 11' to form an eye into which some suitable link 18 might be inserted and connected with a stake or pin 19, which is to be driven into the ground. This construction will only admit, however, of the device being lifted in one direction. Although I have described my invention as the sections being made of wood, yet any other suitable material may be employed, and the eyes, for the purpose of raising and nesting, may be applied to the sections in any other manner than by means of hoops, and although I have shown bars or sticks for raising the protectors any other suitable means may be employed, and the connections may be provided on any convenient part of the device.

Having described my invention, I claim—

1. A plant-protector consisting of a rigid body transversely curved and having external longitudinal ribs one near each edge so arranged as to serve as supports for a similar protector when nested therein.

2. A plant-protector comprising a series of stiff or rigid lapping sections, and means located at a predetermined one of the series whereby the whole number thereof are operated to be raised or lowered together.

3. The combination of a plurality of plant-protectors having transversely-curved rigid bodies lying parallel with each other, a reciprocatable bar lying transversely above them, and a series of crossed pairs of flexible connections extending diagonally from the bar to the protectors severally connecting the same relative lower edges of the latter to the bar, so that reciprocation of the latter effects either the raising or lowering of the connected edges of the protectors substantially as and for the purpose set forth.

4. A plant-protector comprising a series of stiff or rigid lapping sections, and means connecting the overlapping end sections of a series whereby all the end sections of a series may be raised or lowered simultaneously.

5. A plant-protector comprising one or more sections movably anchored in the ground at one edge and provided with eyes at the sides thereof near the lower edge, wires or cords connecting with said eyes and crossing each other at the top of said sections, and a movable operating-bar to which the ends of the wires are connected.

6. A plurality of series of plant-protectors, each series being composed of veneer sections comprising bodies having successively overlapping ends, the first member of each series having eyes located near its edge on opposite sides; a raising means passing over said plurality of series; and flexible crossed means connecting said eyes to said means.

LEONARD J. MERRIMAN.

Witnesses:
FRED. J. DOLE,
C. L. RUSSELL.